United States Patent [19]
Torres

[11] 4,455,948
[45] Jun. 26, 1984

[54] AUTOMOTIVE TRUNK TABLE

[76] Inventor: Israel Torres, Ave. Amalia Paoli SE-25, Levittville, Levittown, P.R. 00632

[21] Appl. No.: 387,934

[22] Filed: Jun. 14, 1982

[51] Int. Cl.³ .............................................. A47B 23/00
[52] U.S. Cl. ..................................... 108/44; 108/138; 224/42.44; 248/421
[58] Field of Search ................... 414/498, 522; 296/22, 296/37.2, 37.1; 248/277, 421; 297/330; 224/42.03, 42.07, 42.36, 42.44, 42.43, 42.08, 311, 273, 320, 318; 108/44, 138; 312/DIG. 33, 266

[56] References Cited

U.S. PATENT DOCUMENTS

| | | | |
|---|---|---|---|
| 724,985 | 4/1903 | Wohlrabe | 248/421 X |
| 1,011,725 | 12/1911 | Benham et al. | 224/42.36 |
| 2,094,401 | 9/1937 | Girl | 296/37.1 X |
| 2,160,958 | 6/1939 | Critchlow | 224/42.44 X |
| 2,391,310 | 12/1945 | Heller | 414/522 X |
| 2,554,776 | 5/1951 | Comeau | 224/42.44 |
| 2,676,709 | 4/1954 | Walsh | 248/432 X |
| 3,406,999 | 10/1968 | Kozicki | 296/37.1 |
| 4,365,836 | 12/1982 | Jackson et al. | 297/330 |

FOREIGN PATENT DOCUMENTS

| | | | |
|---|---|---|---|
| 542657 | 1/1932 | Fed. Rep. of Germany | 224/42.44 |
| 170088 | 10/1901 | United Kingdom | 248/277 |

*Primary Examiner*—James T. McCall
*Attorney, Agent, or Firm*—Oltman and Flynn

[57] ABSTRACT

An automotive table for installation inside a vehicle in compact collapsed form attached to the vehicle floor, and extendable to a position outside the vehicle for use as a work platform or display of merchandise or the like. The table has on the underside two lazy tongs that are at their lower ends, attached to the vehicle floor, typically the floor of the vehicle trunk. From its normal collapsed position inside the vehicle, the table is extended by pulling out the table top while the lazy tongs expand to their fully extended position. A pair of support brackets attached to the base of the table may be manually rotated or raised to a position so that they support the weight of the table and prevent it from collapsing.

5 Claims, 9 Drawing Figures

AUTOMOTIVE TRUNK TABLE

BACKGROUND AND PRIOR ART

For people who spend much of their time travelling in their automobile for recreation or for their livelihood, it is often a great convenience to have a table or platform in the automobile which can be deployed quickly to the outside of the vehicle, using the vehicle for part or complete support.

Such a table or platform which, for part support is attached to a vehicle has been disclosed in earlier patents. U.S. Pat. No. 3,709,159 by Oglesby issued Jan. 9, 1973 discloses a table which is attached to the rear edge of a vehicle trunk and which folds out horizontally to the rear of the vehicle and which has folding legs that fold down to touch the ground and support the table.

U.S. Pat. No. 3,896,742 by Ferraro, issued July 29, 1975, discloses a roll-out table with slats that is normally stored in a compartment in the trunk of a vehicle. Other patents describe tables that fold out from their storage space behind trunk tail gates or van doors.

All earlier such table contructions known to the inventor depend on some form of fold-down legs that rest on the ground for part support. That however is often a drawback, since the ground outside the vehicle may be uneven or otherwise unsuited to support the weight of a table.

Additionally, earlier automotive table constructions require adaptions of the vehicle which limit its utility. The present invention does not have such limitations, as will be understood from the following detailed description thereof.

It is therefore a primary object of the present invention to provide an automotive table that may be conveniently stored inside a vehicle and which may be extended to a position outside the vehicle without the need for ground support.

It is a further important object of the present invention to provide an automotive table which may be quickly and easily extended from a storage position inside the vehicle to its position outside the vehicle by simple manipulation of the table.

It is another important object of the present invention to provide an automotive table that is extendable from a storage position inside the vehicle to an outside position, and that is readily adaptable to a wide range of types of vehicles.

It is still another important object of the present invention to provide an automotive extendable table that occupies a minimum of storage space inside the vehicle in its non-extended position and that does not obstruct access to other vehicle implements such as spare wheel and jack.

It is still another object of the invention to provide an automotive extendable table that can be readily fabricated from inexpensive materials and that is sturdy and durable in operation.

Other advantages of the present invention will become apparent from the following detailed description thereof.

DETAILED DESCRIPTION

The following detailed description covers one of the preferred embodiments of the present invention. It is to be understood however, that the invention is capable of other embodiments that are obvious to those skilled in the art and therefore fall within the scope of the invention. The terminology used herein is for description and not for limitation.

Figure 1:
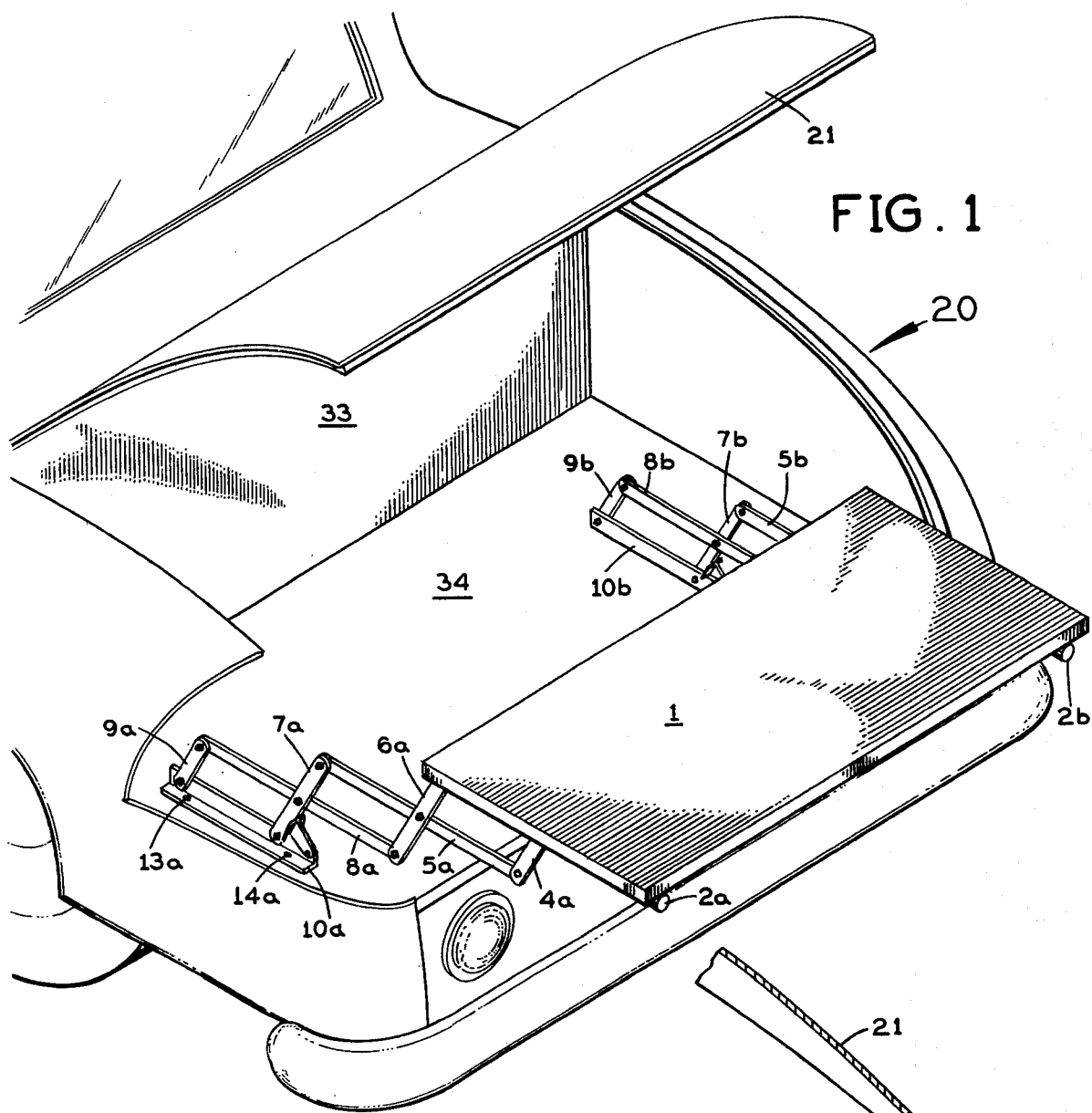
FIG. 1 is a perspective view of the invention installed in a vehicle trunk with the automotive table extended.

FIG. 1 is a perspective view of an automotive table 1 according to the invention. It is, in this case, installed in the trunk space of a vehicle, said space generally at 30 and defined by rear panel 33, floor 34 and trunk lid 21, shown in FIG. 2. The table is shown in its extended position. It follows that the invention may be installed in other types of vehicles, for example in vans or in trunks. It could be installed on the floor of a van and could be extended to the outside of the van, to be used as a platform for the display of merchandise, for working on material or for recreational purposes. It could also be installed on the floor of the passenger compartment of a truck, so that it could be extended to a position outside the truck through the open truck door.

Figure 2:
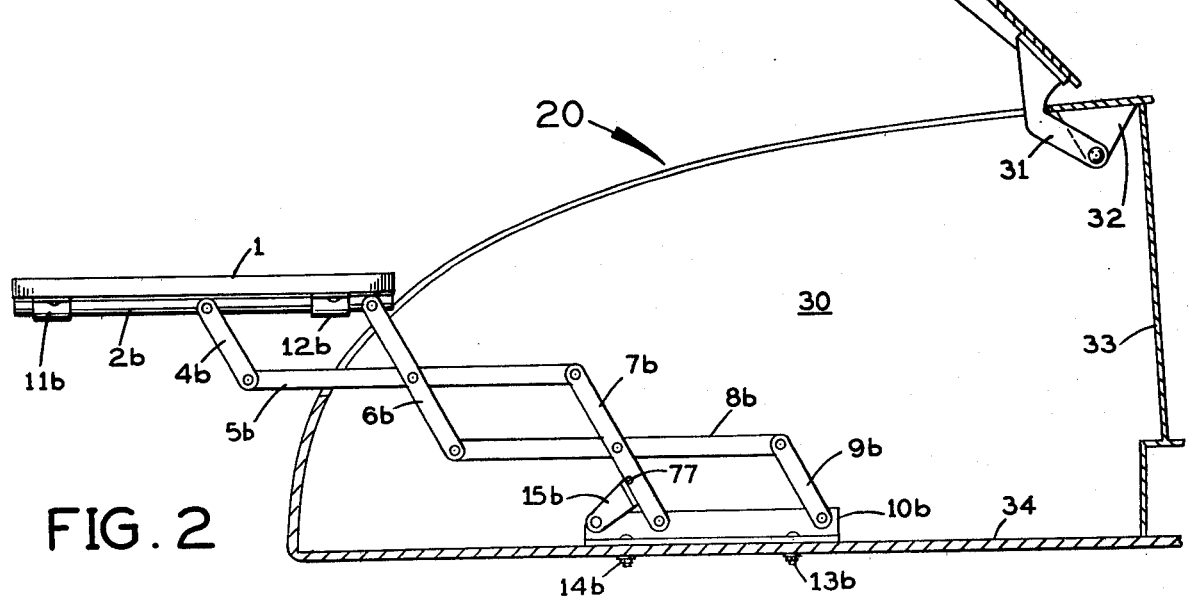
FIG. 2 is a vertical elevational side view of the invention with part of the trunk walls broken away to show the extended lazy tongs and details of the attachment to the trunk floor.

In FIG. 2 the horizontal table top 1 is attached by clips, 11a and 12a on the left hand side to horizontal rod bars 2a and on the right hand side to rod bar 2b by clips 11b and 12b. All the drawings and the following description uses the convention that all parts that are provided on both the right hand and on the left hand side are identified by a suffix letter a or b signifying the left and the right hand side respectively. The clips are attached by means of screws or rivets to the underside of table top 1. The clips, which could be made of any suitable material with spring-action, such as plastic, spring steel, hard draw brass or the like, allows the table to be removed by unsnapping the clips from their grip on the rod bars. The rod bars 2a and 2b are shown as cylindrical rods but could be made of other suitably profiled bar stock.

Two lazy tongs, each consisting of six articulated barshaped members joined together by pivot joints are attached at the upper ends to bar rods 2a and 2b and at the lower ends to floor angles 10a and 10b. There are four generally vertical bar members 4a and b, 6a and b, 7a and b and 9a and b and two generally horizontal bar members 5a and b and 8a and b. The pivoting joints may be screws or rivets. For the purpose of the present invention, the choice of a number of six articulated bar members is arbitrary, and other numbers may be used as the particular construction may merit.

Figure 4:
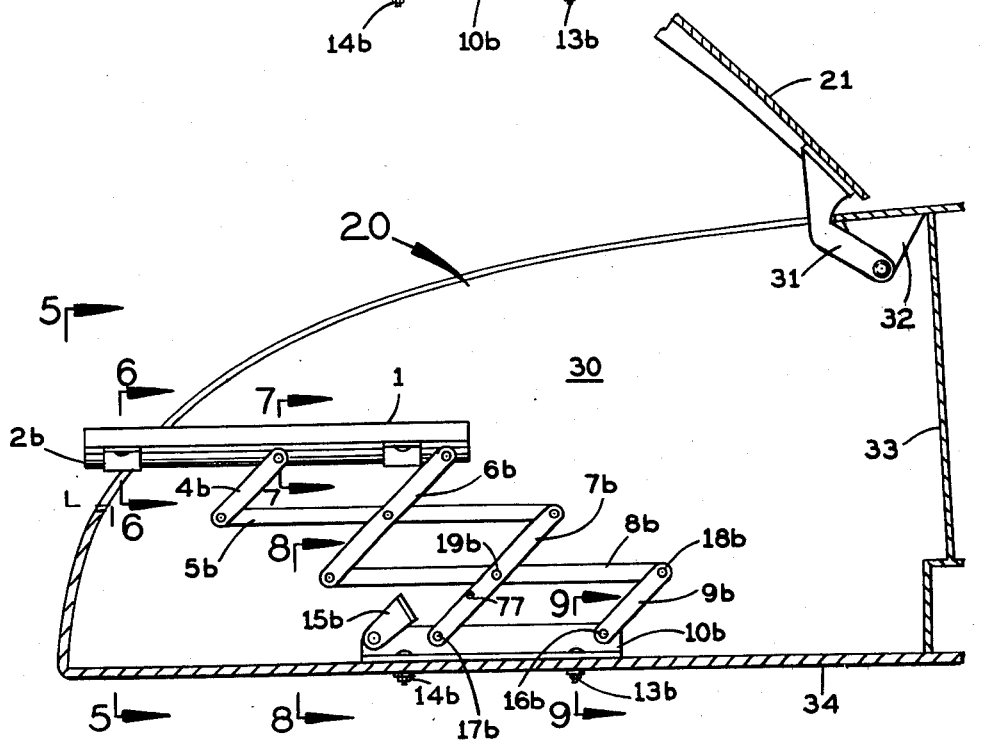
FIG. 4 is a vertical side view of the invention with part of the trunk walls broken away to show the lazy tongs partly extended.
Figure 5:
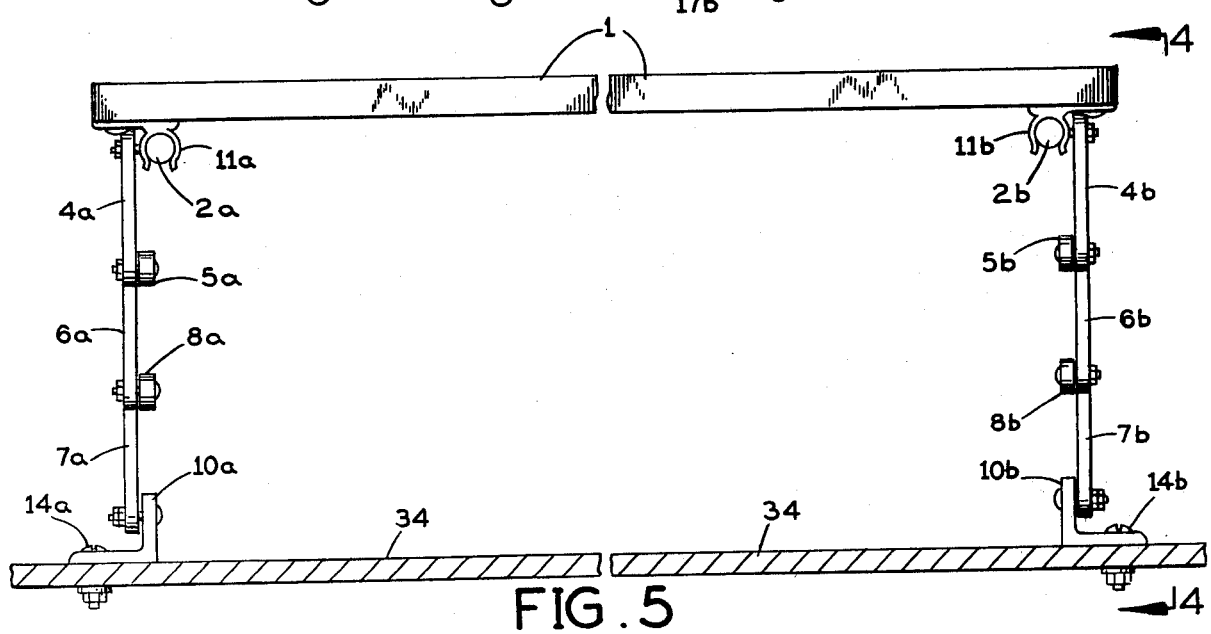
FIG. 5 is a vertical end view of the invention with part of the trunk walls broken away to show the extended lazy tongs from the rear of the vehicle along the line 5—5 of FIG. 4.

In FIG. 4 of the six articulated members, describing now only the right hand side members, and knowing that the right hand and left hand side members are identical, the foremost member 9b is a short member pivotably attached at pivot point 16b to the front end of floor angle 10b. The long articulated member 7b, attached to the rearmost pivot point 17b of the floor angle, is generally of twice the length of the short member 9b and has a pivot point 19b disposed generally midway between its upper and lower ends. A pivotable, generally horizontal, long articulated member 8b is, at its foremost end attached at pivot point 18b to the upper end of the short articulated member 9b and at its midpoint, at pivot point 19b, attached to the midpoint of the long articulated member 7b.

The four pivot points 17b, 16b, 18b and 19b described above, form the four corners of a parallelogram disposed in a vertical plane, hence the articulated members 9a with 7a and the floor angle with 8a are always parallel with each opposing members regardless of the movement of the articulated members, and it follows that since the floor angle 10a is firmly attached to the floor of the vehicle trunk, the long horizontal articulated member 8a will always be in a horizontal position.

By reason of its construction, and as shown especially in FIGS. 1, 2 and 4, a lazy tong consists of a series of parallelograms composed of articulated members that are arranged in opposing pairs so that the opposing pairs are always in parallel relation to each other, e.g., in the present embodiment of the present invention, the opposing pairs, 7b and 9b are always parallel with each other and with opposing pairs 6b and 7b and with 4b and 6b. In analogous manner, the opposing pairs consisting of floor angle 10b and articulated member 8b are always parallel with each other and with the opposing pairs consisting of members 8b and 5b and with 5b and rod bar 2b.

Figure 3:
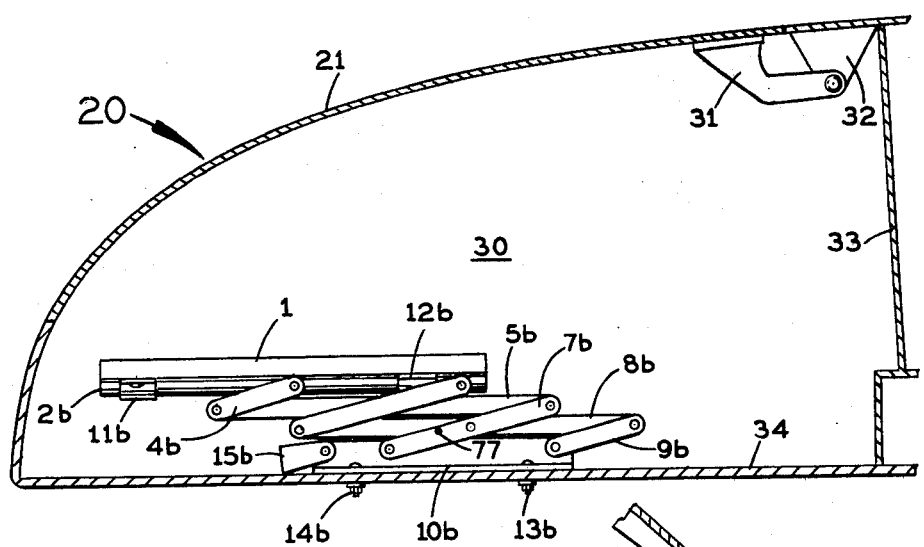
FIG. 3 is a vertical side view of the invention with part of the trunk walls broken away to show the partly collapsed lazy tongs under the closed trunk lid.

It follows, that since the table top 1 is attached to the rod bar 2b in parallel therewith, the table will always remain in parallel position with the floor angle 10b irregardless of its position anywhere between its fully extended position as shown in FIGS. 1 and 2 and in its partially extended position as shown in FIG. 4 and in its almost completely collapsed position shown in FIG. 3.

Figure 8:
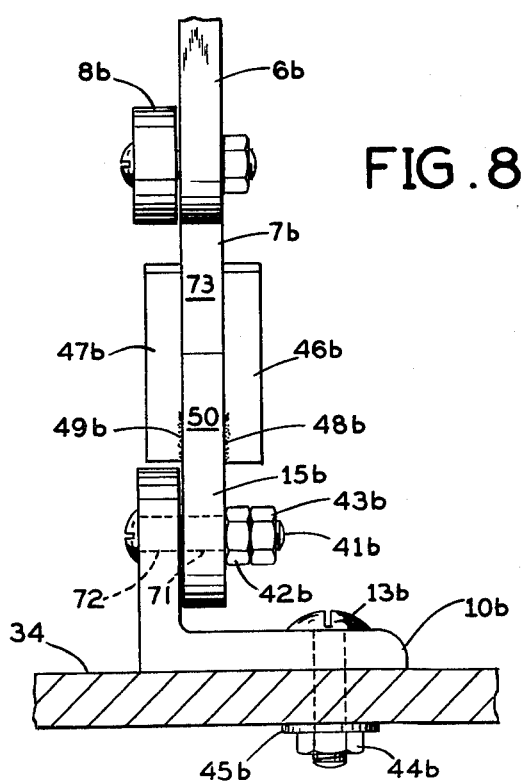
FIG. 8 is a vertical end view of details of pivot point for attachment of support bracket to floor angle.
Figure 9:
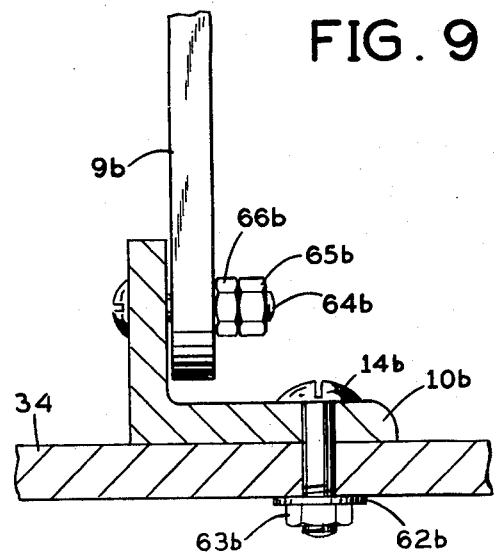
FIG. 9 is a vertical, cross-sectional view of details of a pivot point for attachment of the lower end of an articulated member and a floor angle along the line 9—9 in FIG. 4.

A pair of support brackets 15a and 15b serve to support the table in its extended position. FIG. 8 is a vertical elevational view of the support bracket seen along the line 8—8 of FIG. 4 showing mounting details.

As seen in FIG. 8, the support bracket, generally at 15b has a bracket stem 50 which is pivotably attached to the floor angle 10b by means of the threaded bolt 41b, and two nuts 42b and 43b. The bolt is inserted into a tightly fitting bored hole 72 in the vertical flange of the floor angle, and through a loosely fitting bored hole 71 in the lower end of the bracket stem 50. the bracket stem has, at its upper end, attached thereto, two end plates 46b and 47b welded with weld seams 48b and 49b to the vertical sides of the bracket stem. The two end plates create between them a slot 73 serving to receive the articulated element 7b, when the table is in its fully extended position, seen in FIGS. 1 and 2.

Figure 6:
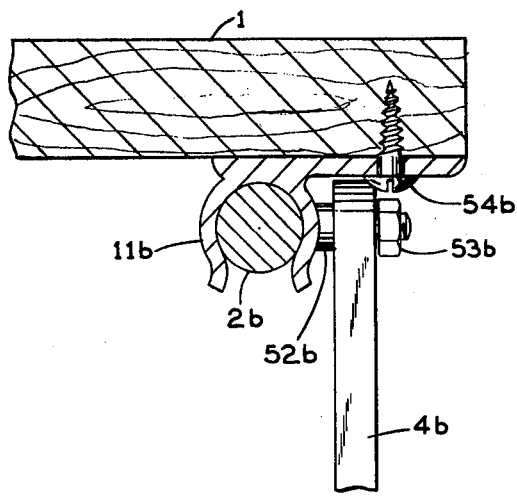
FIG. 6 is a cross-sectional, vertical view of details of clip attachment of automotive table to rod bar seen along the line 6—6 of FIG. 4.

FIG. 6 shows additional details of the attachment of the table 1 to a clip 11b and the clip snapped onto a rod bar 2b. FIG. 6 is seen as a cross-section along the broken line 6—6 in FIG. 4. The clip 11b is attached with wood screw 54b to the underside of the table top 1.

Figure 7:
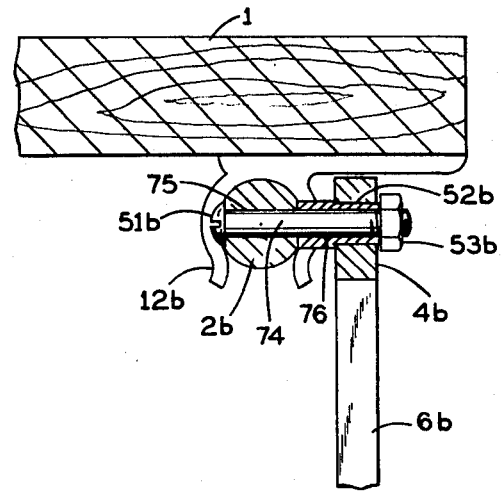
FIG. 7 is a vertical, cross-sectional view of details of a pivot point for attachment of upper end of articulated member to rod bar, seen along the line 7—7 in FIG. 4.

FIG. 7 shows details of a pivot point, namely the upper pivot point of articulated member 4b and its attachment to rod bar 2b. The pivot point consists of a partially threaded bolt 51b with a smooth shaft 74 inserted through a tightly fitting hole 75 bored horizontally transversely through the rod bar 2b. The shaft of the bolt extends through a sleeve 52b having a loosely fitting center bore 76 and is contained by nut 53b. The sleeve 52b is inserted through a tightly fitting hole 52b bored through the upper end of the articulated member 4b. FIG. 7 is seen as a cross-section seen along the broken line 7—7 in FIG. 4.

METHOD OF OPERATION

The automotive trunk table according to the present invention is normally carried in a vehicle where it is installed in a suitable location typically attached to a stong flat surface such as the floor of a vehicle trunk. FIG. 3 shows the table installed in this manner in a trunk space, generally at 30, attached to the trunk floor 34 with screws 13b and 14b. There may be instances where there is no access to the underside of the floor, and in such cases the attachment may be made by means of sheet metal screws or blind rivets. FIG. 3 shows the table with the lazy tongs almost completely collapsed. In its completely collapsed condition, where the table is completely retracted, it has a low profile and occupies a moderate amount of space in the vehicle trunk.

When the table is to be used the trunk lid 21 is opened as its hinge parts 31 and 32 are rotated, and provides access to the automotive table.

The table is then, by manually pulling it at its edges, moved to its extended position. Next, the two support brackets 15a and 15b are raised to their upright position shown in FIGS. 1 and 2, where they support the weight of the table. A small welded stud 77 attached to the articulated members 7a and b right above the upper edges of the end plates 46a and b and 47a and b serve to prevent the lazy tongs from collapsing, once the table has been extended and the support brackets raised.

In restoring the table to its retracted position, the foregoing steps are retraced in their reverse order.

OTHER EMBODIMENTS

Many vehicles are constructed such that a spare wheel and tire is installed on a floor provided below the regular trunk floor and covered with a removable panel positioned in recesses in the upper trunk floor. With the panel in place, the trunk floor is flat. The present trunk table may, in one method of installation be attached to aforesaid lower trunk floor with its two lazy tongs positioned on each side of the spare wheel, and such that, with the table in its retracted position, the table surface fills the panel opening in the upper trunk floor and is flush with the other floor surface.

In still another embodiment, the automotive trunk table may be equipped with hand crank apparatus for extending the table. Such hand crank apparatus may consist of a hand crank with a threaded shaft attached at one end to one of the floor angles and engaging a nut pivotally attached to one of the floor angles and engaging one of the articulated members.

In still another embodiment, the hand crank apparatus may further employ an electric motor for turning the threaded screw under control of suitable switching apparatus.

I claim:

1. For use on a passenger car having a trunk compartment with a floor, a table assembly comprising:
   a table top dimensioned to be completely received inside said trunk compartment;
   a pair of pivoted lazy tong linkages connected at the back end of each to the underside of said table top at laterally spaced locations thereon;
   and a respective mounting member at the front end of each lazy tong linkage for attachment to the floor of the trunk compartment;
   said lazy tong linkages being pivotally adjustable to a collapsed position holding said table top inside said trunk compartment or to an extended position holding said table top in a horizontal position to the rear of said trunk compartment.

2. A table assembly according to claim 1 wherein each mounting member is an angle member adapted to be fastened to the floor of the trunk compartment and pivotally supporting the corresponding lazy tong linkage at its front end.

3. A table assembly according to claim 1 wherein said lazy tong linkages comprise rigid linkage arms which are pivotally interconnected to hold said table top substantially horizontal in the collapsed position of the lazy tong linkages.

4. A table assembly according to claim 1 and further comprising:
   a support member adjustably mounted on each mounting member to engage the corresponding lazy tong linkage and hold the latter in its extended position.

5. A table assembly according to claim 1 wherein:
   each mounting member is an angle member adapted to be fastened to the floor of the trunk compartment and pivotally supporting the corresponding lazy tong linkage at its front end;
   and said lazy tong linkages comprise rigid linkage arms pivotally interconnected to hold the table top substantially horizontal in the collapsed position of the lazy tong linkages;
   and further comprising:
   a respective support member pivotally mounted on each angle member for selective engagement with the corresponding lazy tong linkage to hold the latter in its extended position.

* * * * *